(12) United States Patent
Liu et al.

(10) Patent No.: US 9,306,652 B2
(45) Date of Patent: Apr. 5, 2016

(54) METHOD AND APPARATUS FOR TRANSMITTING DATA

(71) Applicant: Huawei Technologies Co., Ltd., Shenzhen, Guangdong (CN)

(72) Inventors: Jianghua Liu, Beijing (CN); Qiang Wu, Beijing (CN); Chi Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/336,747

(22) Filed: Jul. 21, 2014

(65) Prior Publication Data

US 2014/0355709 A1 Dec. 4, 2014

Related U.S. Application Data

(63) Continuation of application No. PCT/CN2013/070767, filed on Jan. 21, 2013.

(30) Foreign Application Priority Data

Jan. 21, 2012 (CN) .......................... 2012 1 0019841
Jul. 28, 2012 (CN) .......................... 2012 1 0264189

(51) Int. Cl.
*H04B 7/06* (2006.01)
*H04L 5/00* (2006.01)
(Continued)

(52) U.S. Cl.
CPC ............ *H04B 7/0697* (2013.01); *H04B 7/0684* (2013.01); *H04L 5/0023* (2013.01);
(Continued)

(58) Field of Classification Search
CPC ...... H04L 5/0032; H04L 5/0044; H04B 7/02; H04B 7/04; H04B 7/0613

USPC .......................................... 375/260, 267, 299
See application file for complete search history.

(56) References Cited

U.S. PATENT DOCUMENTS

2008/0232494 A1* 9/2008 Pan et al. ...................... 375/260
2012/0155414 A1   6/2012 Noh et al.

FOREIGN PATENT DOCUMENTS

CN   102006107 A   4/2011
CN   102088434 A   6/2011
(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 V10.4.0, Dec. 2011, 125 pages.
(Continued)

*Primary Examiner* — Kevin Kim

(57) ABSTRACT

Embodiments of the present invention disclose a method and an apparatus for transmitting data, and the method includes: first setting at least two second resource groups in each first resource group of at least one first resource group, and setting at least two reference signals in each of the second resource groups; then encoding data to be transmitted and generating two data streams from the encoded data; then, mapping the two data streams onto an available resource element of two different antenna ports, in which the reference signals corresponding to the two different antenna ports are set on two different second resource groups; and finally, transmitting, on the available resource element of the two different antenna ports, data on the two antenna ports. The present invention is applicable to the field of communications systems.

19 Claims, 7 Drawing Sheets

(51) Int. Cl.
*H04L 25/02* (2006.01)
*H04B 7/04* (2006.01)
*H04L 25/03* (2006.01)

(52) U.S. Cl.
CPC ............ *H04L5/0048* (2013.01); *H04L 5/0051* (2013.01); *H04L 25/0204* (2013.01); *H04L 25/0226* (2013.01); *H04B 7/0452* (2013.01); *H04L 5/0053* (2013.01); *H04L 2025/03426* (2013.01)

(56) References Cited

FOREIGN PATENT DOCUMENTS

| WO | WO 2011/034340 A2 | 3/2011 |
| WO | WO 2011/084009 A2 | 7/2011 |

OTHER PUBLICATIONS

"Consideration on Reference Signal for E-PDCCH", InterDigital Communications, LLC, 3GPP TSG RAN WG1 Meeting #67, Nov. 14-18, 2011, 5 pages.
"E-PDCCH Transmission with DMRS as Demodulation RS", Research in Motion, UK Limited, 3GPP TSG RAN WG1 Meeting #67, Nov. 14-18, 2011, 4 pages.
"DM-RS based Distributed and Localized E-PDCCH structure", Samsung, 3GPP TSG RAN WG1 #67, Nov. 14-18, 2011, 4 pages.
"3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.
"Evaluation on necessity of DMRS enhancement under HetNet CoMP scenarios", ZTE, 3GPP TSG RAN WG1 Meeting #66, Aug. 22-26, 2011, 7 pages, R1-112263.

* cited by examiner

METHOD AND APPARATUS FOR TRANSMITTING DATA

CROSS-REFERENCE TO RELATED APPLICATIONS

This application is a continuation of International Application No. PCT/CN2013/070767, filed on Jan. 21, 2013, which claims priorities to Chinese Patent Application No. 201210019841.8, filed on Jan. 21, 2012 and Chinese Patent Application No. 201210264189.6, filed on Jul. 28, 2012, all of which are hereby incorporated by reference in their entireties.

TECHNICAL FIELD

The present invention relates to the field of communications systems, and in particular, to a method and an apparatus for transmitting data.

BACKGROUND

A long term evolution (LTE, Long Term Evolution) standard Rel-8/9/10 communications system improves system performance by adopting a dynamic scheduling technology, that is, a base station (eNB, evolved Node B) schedules and allocates resources according to a channel situation of a user equipment, so that a scheduled user performs transmission on an optimal channel of the user equipment However, the problem of a limited capacity of a PDCCH (Physical Downlink Control Channel, physical downlink control channel) is much highlighted in further evolution of an LTE Rel-10 system. The multi-user MIMO (Multiple-Input Multiple-Output, multiple-input multiple-output) is increasingly applied in an evolution system to improve the spectral efficiency of the system, which increases the number of user equipments scheduled simultaneously, and therefore more PDCCHs are required. Based on this, an existing PDCCH is enhanced, that is, a part of resources are divided from an original PDSCH area to transmit an enhanced PDCCH (e-PDCCH, Enhanced Physical Downlink Control Channel, enhanced physical downlink control channel). In this way, the resources allocated to the e-PDCCH are greatly flexible and are not limited to three OFDM (Orthogonal Frequency Division Multiplexing, orthogonal frequency division multiplexing) symbols anymore, thereby improving the capacity of the PDCCH or the number of user equipments scheduled simultaneously; meanwhile, the e-PDCCH may also adopt a DMRS (UE-specific Reference Signal, demodulation reference signal) based transmission manner and may implement spatial reuse to improve the transmission efficiency of the control channel.

Currently, when data is transmitted in a DMRS based transmitting diversity manner, after space time block code (Alamouti) coding is performed separately on two consecutive REs (Resource Element, resource element) on a frequency domain and two consecutive REs on a time domain, the data is transmitted in two manners, namely, SFBC (Space Frequency Block Coding, space frequency block coding) and STBC (Space Time Block Coding, space time block coding), simultaneously. However, because data of an e-PDCCH is transmitted by adopting two transmitting diversity solutions, the complexity of transmitting and receiving on the eNB and the UE (User Equipment, user equipment) is increased.

SUMMARY

Embodiments of the present invention provide a method and an apparatus for transmitting data, so as to solve the problem of an increase in complexity of transmitting and receiving on an eNB and a UE (User Equipment) due to two transmitting diversity solutions that are adopted when data is transmitted in a DMRS based transmitting diversity manner.

The embodiments of the present invention adopt the following technical solutions:

A method for transmitting data includes:

setting at least two second resource groups in each first resource group of at least one first resource group, in which each of the second resource groups is capable of bearing at least two reference signals, and each reference signal of the at least two reference signals is corresponding to a different antenna port;

encoding data to be transmitted and generating two data streams from the encoded data;

mapping the two data streams onto an available resource element of two different antenna ports, in which the reference signals corresponding to the two different antenna ports are borne on two different second resource groups of the first resource group; and transmitting, on the available resource element of the two different antenna ports, data on the two antenna ports.

An apparatus for transmitting data includes:

a setting unit, configured to set at least two second resource groups in each first resource group of at least one first resource group, in which each of the second resource groups is capable of bearing at least two reference signals, and each reference signal of the at least two reference signals is corresponding to a different antenna port;

a generating unit, configured to encode data to be transmitted and generate two data streams from the encoded data;

a mapping unit, configured to map the two data streams generated by the generating unit onto an available resource element of two different antenna ports, in which the reference signals corresponding to the two different antenna ports are borne on two different second resource groups of the first resource group, and the two different second resource groups are set by the setting unit; and a transmitting unit, configured to transmit, on the available resource element of the two different antenna ports, data mapped by the mapping unit onto the two antenna ports.

In the method and the apparatus for transmitting data provided by the embodiments of the present invention, first at least two second resource groups are set in each first resource group of at least one first resource group, and at least two reference signals are set in each of the second resource groups; then two data streams are generated after data required to be transmitted is coded; then, the two data streams are mapped onto available resource element of two different antenna ports, in which reference signals corresponding to the two different antenna ports are set on two different second resource groups; and finally, data on the two antenna ports is transmitted on the available resource element of the two different antenna ports. Currently, data can be transmitted in two manners, namely, SFBC and STBC, simultaneously, but because data transmission of an e-PDCCH needs to adopt two transmitting diversity solutions, complexity of transmitting and receiving on an eNB and a UE is increased. However, in the embodiments of the present invention, data can be transmitted only in need of one transmitting diversity solution, so as to solve the problem of the increase in the complexity of transmitting and receiving on the eNB and the UE.

BRIEF DESCRIPTION OF THE DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To make the advantages of the technical solutions of the present invention more comprehensible, the following describes the present invention in further detail with reference to the accompanying drawings and embodiments.

Embodiment 1

Figure 1:
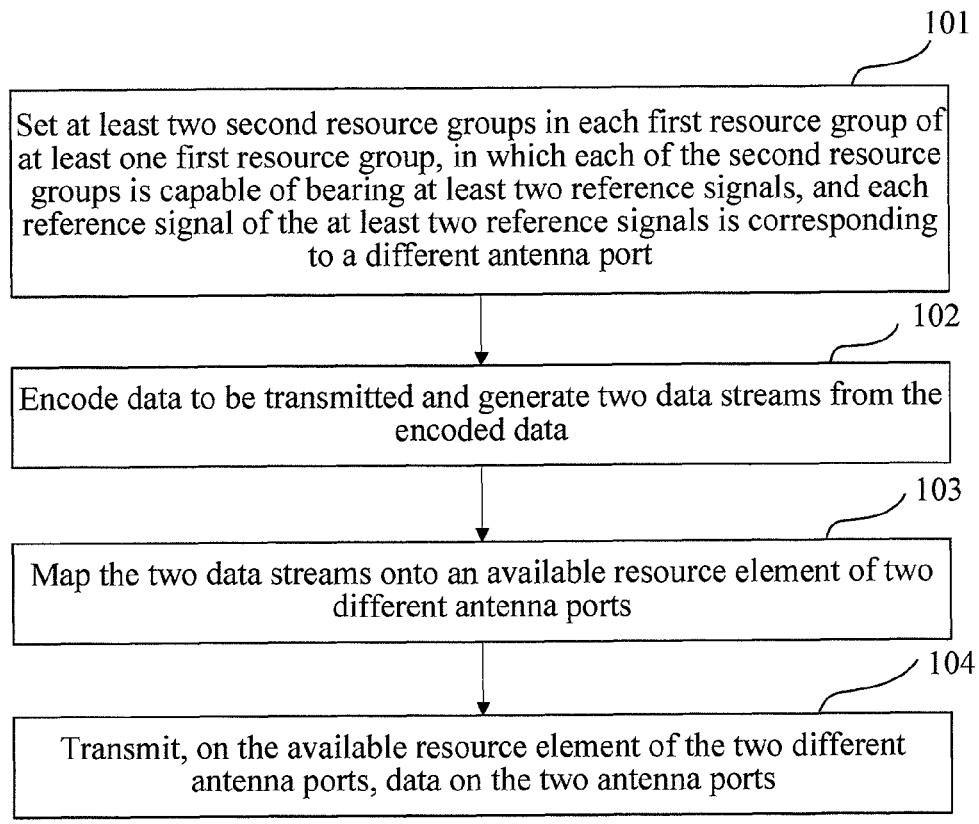
FIG. 1 is a flow chart of a method for transmitting data according to Embodiment 1 of the present invention.

This embodiment provides a method for transmitting data, and as shown in FIG. 1, the method includes the following steps:

101. Set at least two second resource groups in each first resource group of at least one first resource group, in which each of the second resource groups is capable of bearing at least two reference signals, and each reference signal of the at least two reference signals is corresponding to a different antenna port.

The first resource group may be a physical resource block pair, the second resource group may be a resource element RE, and each reference signal of the at least two reference signals corresponds to one antenna port; the second resource groups are orthogonal to each other in time and frequency, and each of the second resource groups includes 12 REs.

For example, eight antenna ports are defined as DMRS port 7 to DMRS port 14, each DMRS port corresponds to a DMRS, and information about each DMRS includes a time frequency resource occupied by the DMRS and a DMRS sequence. DMRSs associated with the DMRS ports {7, 8, 11, 13} are defined or set on 12 REs on a physical resource block pair (PRB pair). Specifically, a physical resource block contains 12 consecutive subcarriers on a frequency domain and 7 consecutive OFDM symbols on a time domain, and a physical resource block pair refers to two consecutive physical resource blocks in the time. For example, a physical resource block pair contains 12 consecutive subcarriers on the frequency domain and 14 consecutive OFDM symbols on the time domain, in which the former 7 OFDM symbols belong to a first physical resource block, and the latter 7 OFDM symbols belong to a second physical resource block. DMRSs associated with the DMRS ports {9, 10, 12, 14} are defined or set on the other 12 REs on the same PRB pair. FIG. 5 to FIG. 8 separately denote situations of time frequency resources occupied by four DMRS ports {7, 8} and {9, 10} in a PRB pair, and ports 7 and 8 occupy the same time frequency resource but are distinguished using DMRS sequences associated with them; ports 9 and 10 are similar to ports 7 and 8. Under a situation in which 8 DMRS ports exist, DMRSs associated with the ports {7, 8, 11, 13} occupy the same time frequency resource and are distinguished using DMRS sequences; likewise, DMRSs associated with the ports {9, 10, 12, 14} occupy the same time frequency resource and are distinguished using DMRS sequences.

102. Encode data to be transmitted and generate two data streams from the encoded data.

The coding manner is space frequency block coding or space time block coding.

In another aspect, the coding may also be precoding, that is, a precoding operation is performed on the data required to be transmitted, because the space frequency block coding or the space time block coding can be denoted as a special implementation manner of precoding. A specific operation of precoding is relevant to a reference signal used at the time of transmitting data. When the used reference signal is a cell-specific reference signal, such as a CRS (cell-specific reference signal) in an LTE system, a precoding operation at this time is to precode data using a precoding matrix or vector, and then each data stream after the precoding corresponds to an antenna port corresponding to a CRS; when the used reference signal is a user-equipment-specific reference signal, such as a DMRS (UE-specific reference signal) in an LTE system, a precoding operation at this time is that data directly corresponds to an antenna port corresponding to a DMRS to obtain a corresponding data stream. For example, a precoding operation $$\begin{bmatrix} y^{(7)}[i] \\ y^{(8)}[i] \end{bmatrix} = \begin{bmatrix} x^{(0)}(i) \\ x^{(1)}(i) \end{bmatrix},$$

$$i = 0, 1, \ldots, N-1,$$

N is an integer denotes that data $x^{(0)}(i)$ directly corresponds to DMRS antenna port 7, and data $x^{(1)}(i)$ directly corresponds to DMRS antenna port 8, and obtained corresponding data streams are $y^{(7)}[i]$, $y^{(8)}[i]$, i=0, 1, ..., N−1.

Here, a first data stream corresponds to an antenna port corresponding to a reference signal in the first one of the second resource groups in the first resource group, and a second data stream corresponds to an antenna port corresponding to a reference signal in the second one of the second resource groups in the first resource group. The lengths of two data streams generated after the data is coded may be equal or may also be unequal. For example, the data required to be transmitted is x(0), x(1), . . . , x(N−1), N is an even number, and two data streams whose lengths are equal are obtained by performing space frequency block coding or space time block coding on the data; two data streams whose lengths are equal can also be obtained by precoding the data, for example, $$\begin{bmatrix} y^{(7)}[i] \\ y^{(9)}[i] \end{bmatrix} = \begin{bmatrix} x(i) \\ x(i+N/2) \end{bmatrix},$$

$$i = 0, 1, \ldots, N/2 - 1;$$

two data streams whose lengths are unequal may also be obtained by precoding the data, for example, a first data stream is $y^{(7)}[i]=x(i)$, $i=0, 1, \ldots, L-1$, $L<N$, $L \neq N/2$, a second data stream is $y^{(9)}[j]=x(j+L)$, $j=0, 1, \ldots, N-1-L$, and it is assumed here that DMRS ports used in the at least one first resource group are ports 7 and 9. Additionally, the first data stream may include $y^{(7)}_{first\ resource\ group\ 1}[i]=x(i)$, $i=0, 1, \ldots, L_1-1$, $L_1<N$ and $y^{(8)}_{first\ resource\ group\ 2}[i]=x(i+L_1)$, $i=0, 1, \ldots, L_2-1$, $L_1+L_2<N$, and the second data stream may include $y^{(9)}_{first\ resource\ group\ 1}[i]=x(i+L_1+L_2)$, $i=0, 1, \ldots, L_3-1$, $L_1+L_2+L_3<N+L_3<N$ and $y^{(10)}_{first\ resource\ group\ 2}[i]=x(i+L_1+L_2+L_3)$, $i-0, 1, \ldots, L_4-1$, $L_1+L_2+L_3+L_4=N$, in which respective values of $L_1$, $L_2$, $L_3$, $L_4$ may be 0; it is assumed here that two first resource groups exist, DMRS ports used in the first one of the first resource groups are ports 7 and 9, and DMRS ports used in the second one of the first resource groups are ports 8 and 10.

103. Map the two data streams onto an available resource element of two different antenna ports.

Respective reference signals corresponding to the two different antenna ports are set on two different second resource groups. Additionally, an available resource element of each antenna port refers to a resource element that can be configured to transmit a data stream generated by the coding. For example, except a resource element occupied by a PDCCH and a reference signal, another resource element can be configured to transmit the data stream.

104. Transmit, on the available resource element of the two different antenna ports, data on the two antenna ports.

Figure 2:
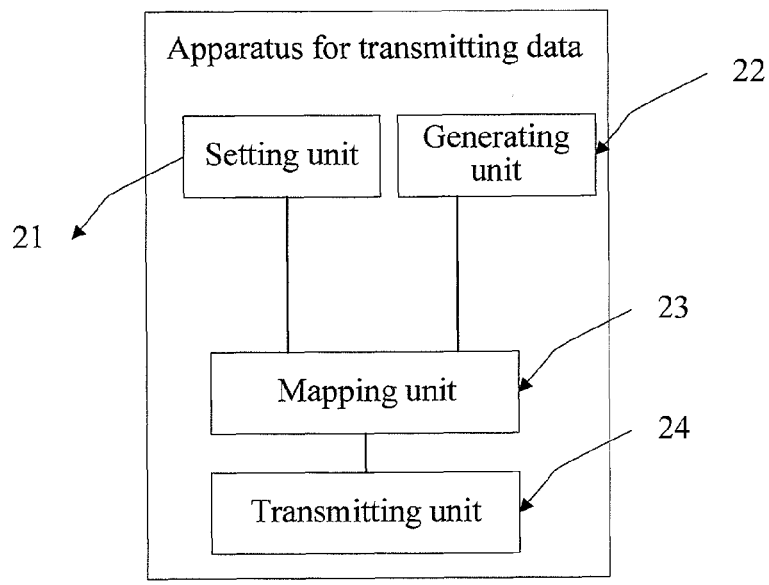
FIG. 2 is a schematic structural diagram of an apparatus for transmitting data according to Embodiment 1 of the present invention.

This embodiment provides an apparatus for transmitting data, and as shown in FIG. 2, the apparatus includes a setting unit 21, a generating unit 22, a mapping unit 23, and a transmitting unit 24.

The setting unit 21 is configured to set at least two second resource groups in each first resource group of at least one first resource group, in which each of the second resource groups is capable of bearing at least two reference signals, and each reference signal of the at least two reference signals corresponds to a different antenna port.

The first resource group is a physical resource block pair, the second resource group is a resource element RE, and each reference signal of the at least two reference signals is corresponding to one antenna port; the second resource groups are orthogonal to each other in time and frequency, and each of the second resource groups includes 12 REs.

For example, eight antenna ports are defined as DMRS port 7 to DMRS port 14, each DMRS port corresponds to a DMRS, and information about each DMRS includes a time frequency resource occupied by the DMRS and a DMRS sequence. DMRSs associated with the DMRS ports {7, 8, 11, 13} are defined or set on 12 REs on a physical resource block pair (PRB pair). Specifically, a physical resource block contains 12 consecutive subcarriers on a frequency domain and 7 consecutive OFDM symbols on a time domain, and a physical resource block pair refers to two consecutive physical resource blocks in the time. For example, a physical resource block pair contains 12 consecutive subcarriers on the frequency domain and 14 consecutive OFDM symbols on the time domain, in which the former 7 OFDM symbols belong to a first physical resource block, and the latter 7 OFDM symbols belong to a second physical resource block. DMRSs associated with the DMRS ports {9, 10, 12, 14} are defined or set on the other 12 REs on the same PRB pair. FIG. 5 to FIG. 8 separately denote situations of time frequency resources occupied by four DMRS ports {7, 8} and {9, 10} in a PRB pair, and ports 7 and 8 occupy the same time frequency resource but are distinguished using DMRS sequences associated with them; ports 9 and 10 are similar to ports 7 and 8. Under a situation in which 8 DMRS ports exist, DMRSs associated with the ports {7, 8, 11, 13} occupy the same time frequency resource and are distinguished using DMRS sequences; likewise, DMRSs associated with the ports {9.10, 12, 14} occupy the same time frequency resource and are distinguished using DMRS sequences.

The generating unit 22 is configured to encode data to be transmitted and generate two data streams from the encoded data.

The coding manner is space frequency block coding or space time block coding.

Additionally, the coding may also be precoding, that is, a precoding operation is performed on the data required to be transmitted, because the space frequency block coding or the space time block coding can be denoted as a special implementation manner of precoding.

The mapping unit 23 is configured to map the two data streams generated by the generating unit 22 onto an available resource element of two different antenna ports.

Respective reference signals corresponding to the two different antenna ports are set on two different second resource groups. Additionally, an available resource element of each antenna port refers to a resource element that can be configured to transmit a data stream generated by the coding. For example, except resource element occupied by a PDCCH and a reference signal, another resource element can be configured to transmit the data stream.

The transmitting unit 24 is configured to transmit, on the available resource element of the two different antenna ports, data mapped by the mapping unit 23 onto the two antenna ports.

In the method and the apparatus for transmitting data provided by this embodiment of the present invention, first at least two second resource groups are set in each first resource group of at least one first resource group, and at least two reference signals are set in each of the second resource groups; then two data streams are generated after data required to be transmitted is coded; then, the two data streams are mapped onto an available resource element of two different antenna ports, in which reference signals corresponding to the two different antenna ports are set on two different second resource groups; and finally, data on the two antenna ports is transmitted on the available an resource element of the two different antenna ports. Currently, data can be transmitted in two manners, namely, SFBC and STBC, simultaneously, but because data transmission of an e-PDCCH needs to adopt two transmitting diversity solutions, complexity of transmitting and receiving on an eNB and a UE is increased. However, in this embodiment of the present invention, data can be transmitted only in need of one transmitting diversity solution, so as to solve the problem of the increase in the complexity of transmitting and receiving on the eNB and the UE and the problem of poor channel estimation performance, and additionally, the time-frequency orthogonal reference signal also improves the channel estimation performance.

Embodiment 2

Figure 3:
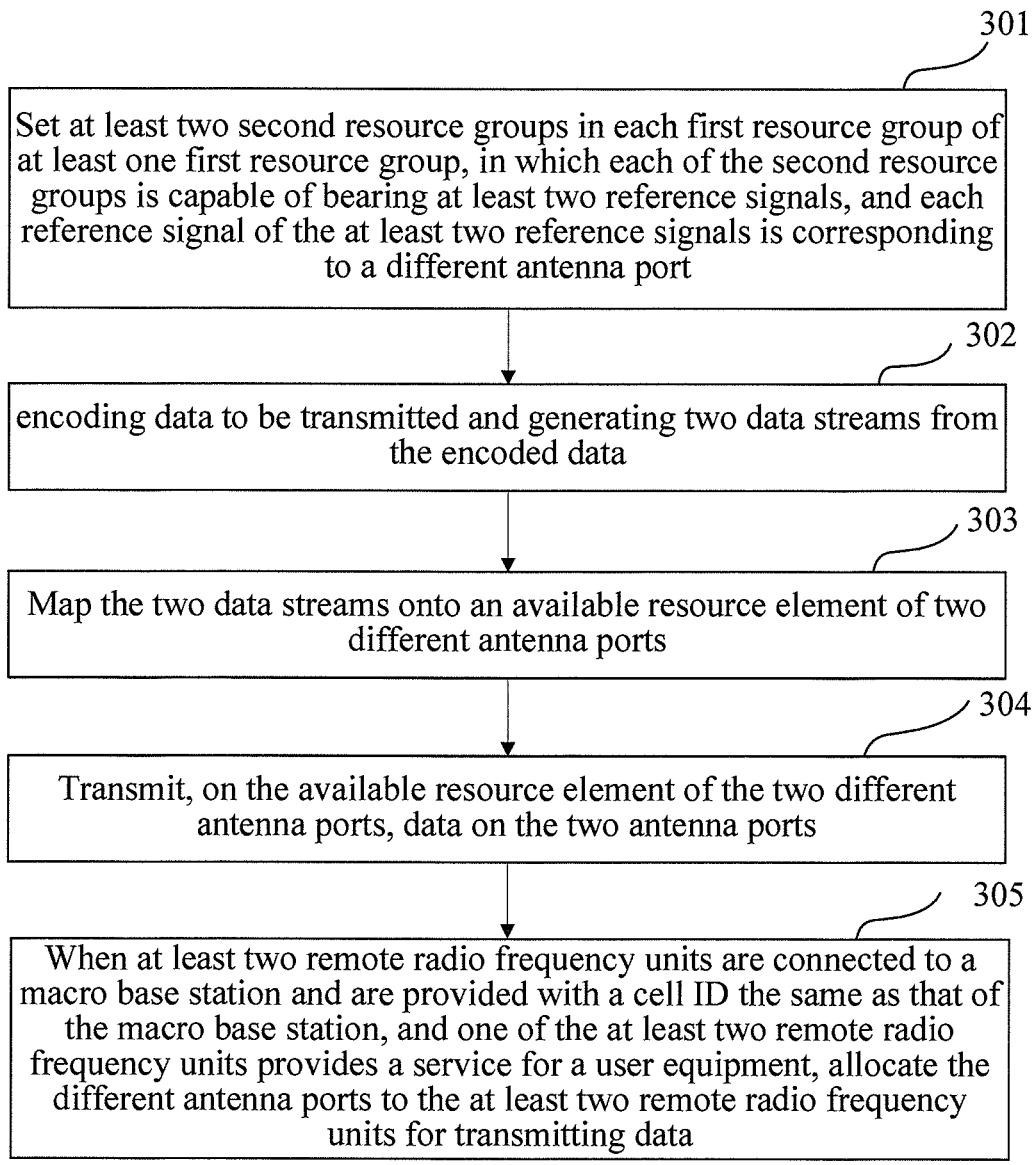
FIG. 3 is a flow chart of a method for transmitting data according to Embodiment 2 of the present invention.

This embodiment provides a method for transmitting data, and as shown in FIG. 3, the method includes the following steps:

301. Set at least two second resource groups in each first resource group of at least one first resource group, and set at least two reference signals in each of the second resource groups.

The first resource group is a physical resource block pair, the second resource group is a resource element RE, and each reference signal of the at least two reference signals is corresponding to one antenna port; the second resource groups are orthogonal to each other in time and frequency, and each of the second resource groups includes 12 REs.

302. Encode data to be transmitted and generate two data streams from the encoded data.

The coding manner is space frequency block coding or space time block coding.

Additionally, the coding may also be precoding, that is, a precoding operation is performed on the data required to be transmitted, because the space frequency block coding or the space time block coding can be denoted as a special implementation manner of precoding.

303. Map the two data streams onto an available resource element of two different antenna ports.

Respective reference signals corresponding to the two different antenna ports are set on two different second resource groups.

304. Transmit, on the available resource element of the two different antenna ports, data on the two antenna ports.

Figure 9:
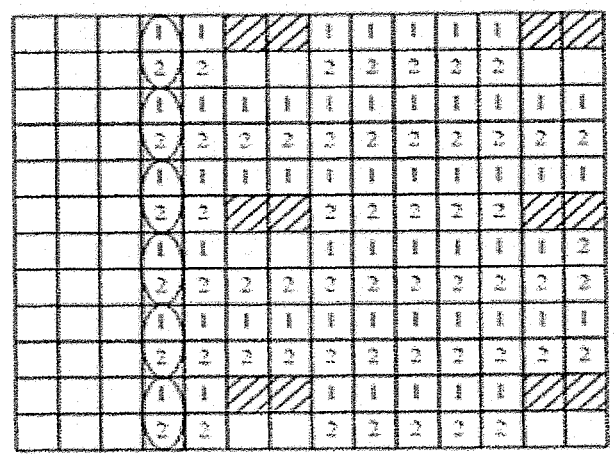
FIG. 9 is a schematic diagram of coding of a physical resource block pair of DMRS port 7.
Figure 10:
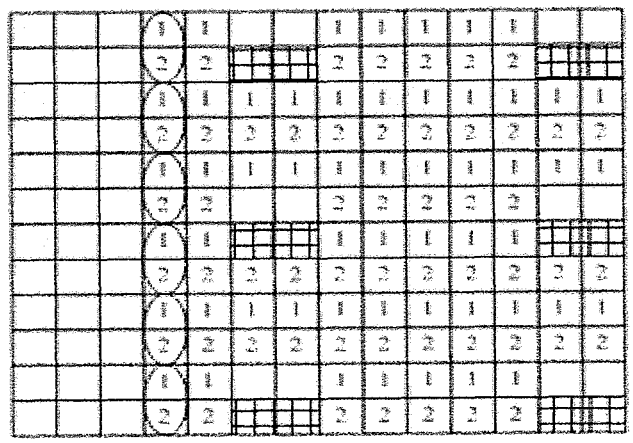
FIG. 10 is a schematic diagram of coding of a physical resource block pair of DMRS port 8.

Specifically, in this embodiment of the present invention, the antenna ports are DMRS ports, and as shown in FIG. 5 to FIG. 8, REs of two second resource groups are defined in a first resource group PRB pair, in which each group of resource elements includes 12 REs, and these two groups of REs are orthogonal in time and frequency; two reference signals are defined on the first group of 12 REs, these two reference signals corresponds to DMRS ports 7 and 8, and the other two reference signals are defined on the second group of 12 REs, and correspond to DMRS ports 9 and 10. The two antenna ports adopted in this embodiment are associated with the reference signals defined on the first group of 12 REs and the second group of 12 REs, for example, DMRS ports 7 and 9, DMRS ports 8 and 10, DMRS ports 8 and 9, and DMRS ports 8 and 10. Further, the adopted two ports are DMRS ports 7 and 9, the adopted transmitting diversity solution is SFBC, the SFBC codes e-PDCCH data required to be transmitted to obtain two data streams, and these two data streams are separately mapped onto DMRS ports 7 and 9. As shown in FIG. 9 and FIG. 10, in the drawings, the former three columns of REs is a PDCCH area, that is, resource elements of this part are unavailable, "1" and "2" on the same time frequency resource location on the two ports are used to transmit the output of an Alamouti code, and resource elements marked with "1" and "2" are available resource elements.

For example, an e-PDCCH modulation symbol required to be transmitted is $D=\{d_0, d_1, \ldots d_{2N-1}\}$, in which $d_i$, $i=0$, $1, \ldots, 2N-1$ is a modulation symbol, and N is a positive integer. D is divided into two modulation symbol sets X and Y, which are $X=\{x_0, x_1, \ldots, x_{N-1}\}$, $Y=\{y_0, y_1, \ldots, y_{N-1}\}$ respectively, in which $x_i=d_{2i}$, $y_i=d_{2i+1}$, $i=0, 1, \ldots, N-1$; then, SFBC $$\begin{pmatrix} x_i & y_i \\ -y_i^* & x_i^* \end{pmatrix} i = 0, 1, \ldots, N-1$$

is performed on element symbols in X, Y, in which * denotes that a conjugation operation is performed to obtain two data streams M and N, which are specifically $M=\{m_0, m_1, \ldots, m_{2N-1}\}$ and $N=\{n_0, n_1, \ldots, n_{2N-1}\}$, in which $m_{2i}=x_i$, $m_{2i+1}=y_i$, $n_{2i}=-y^*_i$, $n_{2i+1}=s^*_i$, and $i=0, 1, \ldots, N-1$; secondly, the two data streams M, N are mapped onto DMRS ports 7 and 9 respectively.

Figure 11:
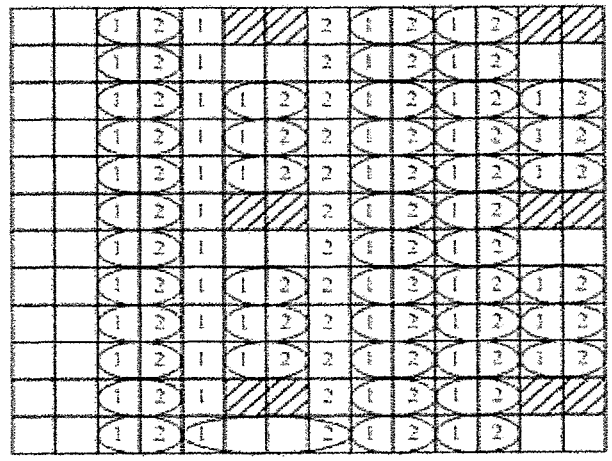
FIG. 11 is a schematic diagram of coding of a physical resource block pair of DMRS port 9.
Figure 12:
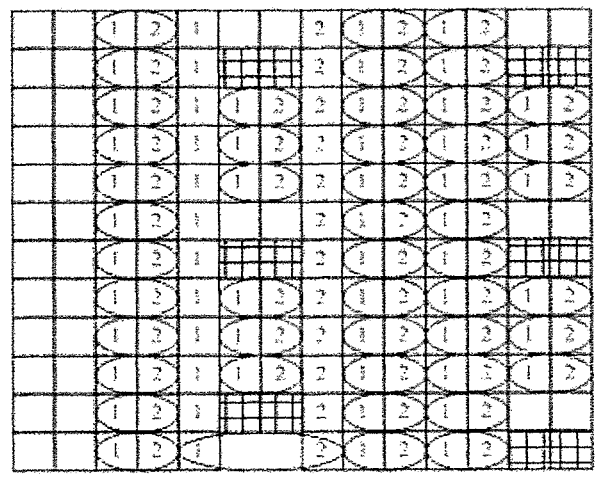
FIG. 12 is a schematic diagram of coding of a physical resource block pair of DMRS port 10.

The transmitting diversity solution in this embodiment of the present invention is not limited to the SFBC. When the number of available OFDM symbols in a PRB pair is an odd number, as shown in FIG. 11 and FIG. 12, the number of available OFDM symbols is two, and the STBC can also be adopted. In the drawings, the former two columns of REs is a PDCCH area, that is, resource elements of this part are unavailable.

305. When at least two remote radio frequency units are connected to a macro base station and are provided with a cell ID the same as that of the macro base station, and one of the at least two remote radio frequency units provides a service for a user equipment, allocate the different antenna ports to the at least two remote radio frequency units, and map data onto the allocated antenna ports to transmit the data.

Figure 13:
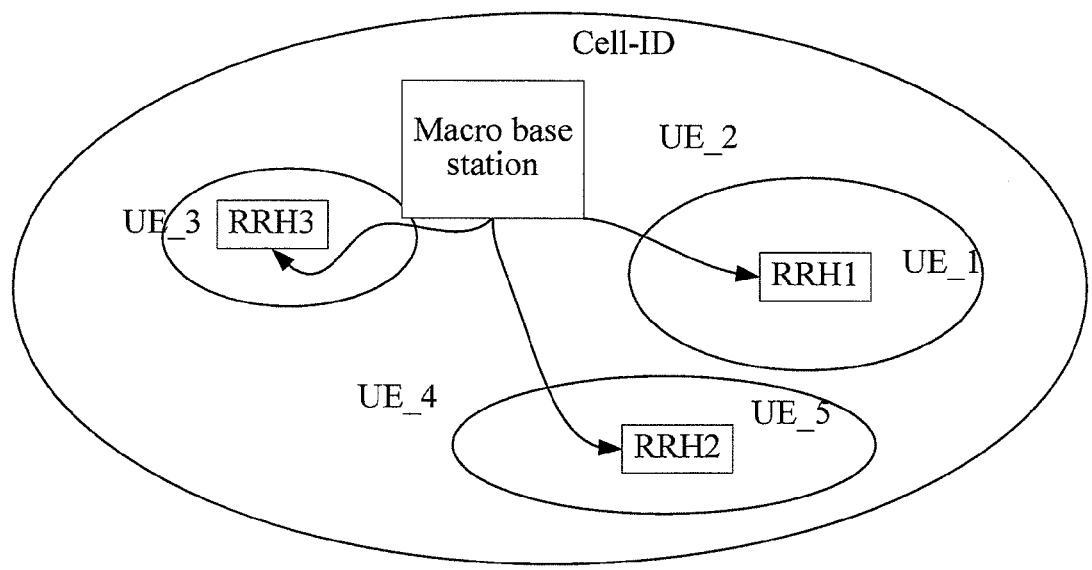
FIG. 13 is a schematic diagram of interference between different RRHs.

Specifically, in a heterogeneous network scenario, besides the macro base station, a plurality of RRHs is set within the coverage of a macro cell, these RRHs are connected to the macro base station through optic fibers or in other manners, and these RRHs are provided with a cell identity (ID) the same as that of the macro cell where these RRHs are located; because of the DMRS based transmitting mode, each RRH is capable of individually serving some users, but each RRH is transparent for the users. Under this scenario, a UE served by a RRH boundary is subject to interference from another neighboring RRH, and as shown in FIG. 13, UE_5 served by RRH2 is subject to interference from RRH1. The influence of this interference on the DMRS interference is serious somewhat, because the DMRS is used to estimate a channel, and a data channel is detected by utilizing the estimated channel.

When this embodiment of the present invention is applied to this scenario, interference between DMRSs can be avoided by allocating different DMRS ports to different RRHs or UEs. Without loss of generality, illustration is made using a specific example here. Still taking RRH1 and RRH2 in FIG. 13 as an example, DMRS ports that can be allocated to RRH1 or a UE served in RH1 are ports 7 and 9 respectively, and DMRS ports that can be allocated to RRH2 or a UE served in RRH2 are ports 8 and 10 respectively. In this way, a UE in each RRH only needs to adopt one transmitting diversity solution SFBC during transmitting. Additionally, because DMRS sequences associated with DMRS ports 7 and 8 (or 9 and 10) defined on the same group of resource elements are orthogonal or quasi-orthogonal, interference between DMRSs of UEs at two RRH boundaries can be avoid or reduced, thereby improving channel estimation performance.

In this embodiment of the present invention, the at least two PRB pairs may be consecutive or discrete on a frequency domain, and preferably be discrete. It is assumed below that four PRB pairs are used to transmit an e-PDCCH, and these four PRB pairs are discrete on the frequency domain, and adopt the transmitting diversity solution. When the e-PDCCH is transmitted, each e-PDCCH can be individually mapped onto some REs in these four PRB pairs, for example, the e-PDCCH of UE1 is divided into four parts, and these four parts are mapped onto REs on the fourth and fifth OFDM symbols of PRB pairs 1 to 4; or e-PDCCHs of at least two UEs are placed together and interleaved, and then the interleaved data is mapped into the four PRB pairs according to a certain rule.

Figure 4:
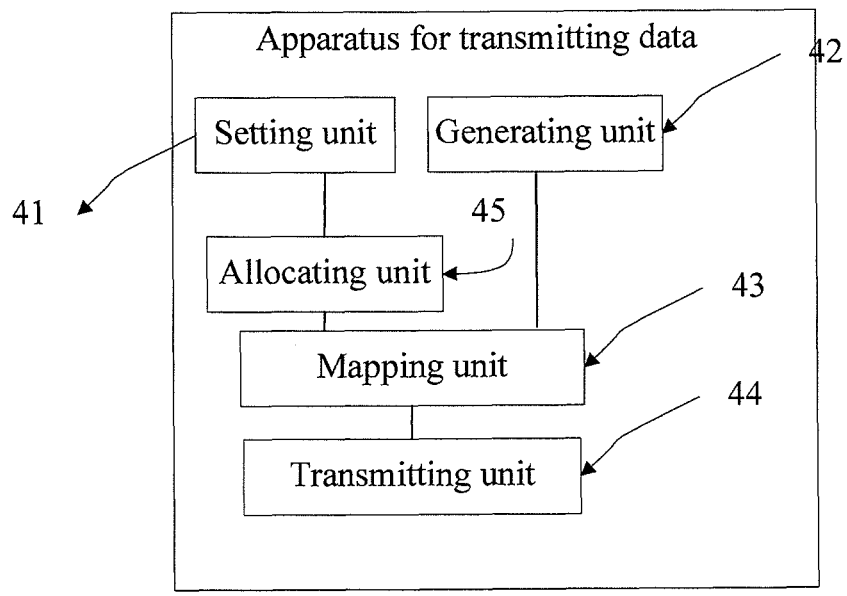
FIG. 4 is a schematic structural diagram of an apparatus for transmitting data according to Embodiment 2 of the present invention.
Figure 5:
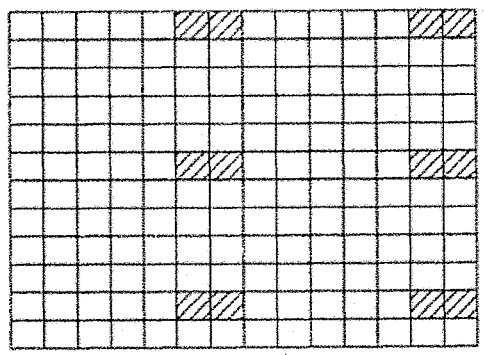
FIG. 5 is a schematic diagram of a physical resource block pair of DMRS port 7.
Figure 6:
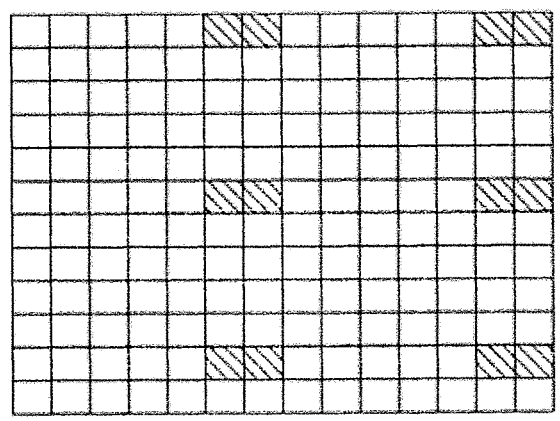
FIG. 6 is a schematic diagram of a physical resource block pair of DMRS port 8.
Figure 7:
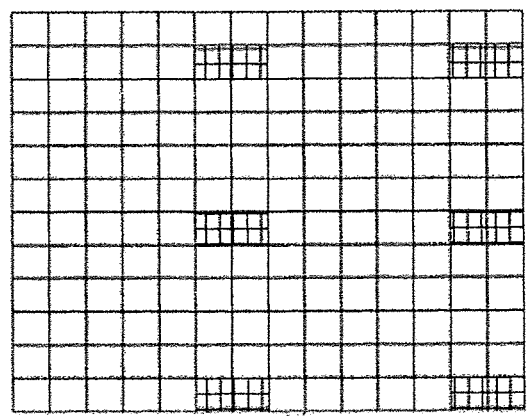
FIG. 7 is a schematic diagram of a physical resource block pair of DMRS port 9.
Figure 8:
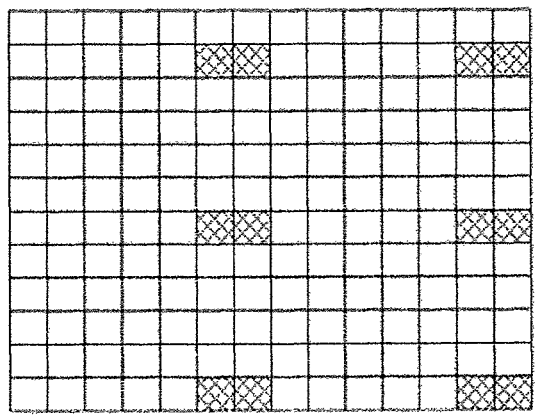
FIG. 8 is a schematic diagram of a physical resource block pair of DMRS port 10.

This embodiment provides an apparatus for transmitting data, and as shown in FIG. 4, the apparatus includes a setting unit 41, a generating unit 42, a mapping unit 43, a transmitting unit 44, and an allocating unit 45.

The setting unit 41 is configured to set at least two second resource groups in each first resource group of at least one first resource group, and be capable of bearing at least two reference signals in each of the second resource groups.

The first resource group is a physical resource block pair, the second resource group is a resource element RE, and each reference signal of the at least two reference signals is corresponding to one antenna port; the second resource groups are orthogonal to each other in time and frequency, and each of the second resource groups includes 12 REs.

The generating unit 42 is configured to encode data to be transmitted and generate two data streams from the encoded data.

The coding manner is space frequency block coding or space time block coding.

Additionally, the coding may also be precoding, that is, a precoding operation is performed on the data required to be transmitted, because the space frequency block coding or the space time block coding can be denoted as a special implementation manner of precoding.

The mapping unit 43 is configured to map the two data streams generated by the generating unit 42 onto an available resource element of two different antenna ports.

Respective reference signals corresponding to the two different antenna ports are borne on two different second resource groups.

The transmitting unit 44 is configured to transmit, on the available resource element of the two different antenna ports, data mapped by the mapping unit 43 onto the two antenna ports.

The allocating unit 45 is configured to, when at least two remote radio frequency units are connected to a base station, and one of the at least two remote radio frequency units provides a service for a user equipment, allocate the different antenna ports set by the setting unit to the at least two remote radio frequency units, and the mapping unit maps data onto the antenna ports allocated by the allocating unit to transmit the data.

In the method and the apparatus for transmitting data provided by this embodiment of the present invention, first at least two second resource groups are set in each first resource group of at least one first resource group, and at least two reference signals are set in each of the second resource groups; then two data streams are generated after data required to be transmitted is coded; then, the two data streams are mapped onto an available resource element of two different antenna ports, in which reference signals corresponding to the two different antenna ports are set on two different second resource groups; and finally, data on the two antenna ports is transmitted on the available resource element of the two different antenna ports. Currently, data can be transmitted in two manners, namely, SFBC and STBC, simultaneously, but because data transmission of an e-PDCCH needs to adopt two transmitting diversity solutions, complexity of transmitting and receiving on an eNB and a UE is increased. However, in this embodiment of the present invention, data can be transmitted only in need of one transmitting diversity solution, so as to solve the problem of the increase in the complexity of transmitting and receiving on the eNB and the UE, and additionally, the time-frequency orthogonal reference signal also improves the channel estimation performance.

The apparatus for transmitting data provided by the embodiments of the present invention can implement the method embodiments provided above. Reference may be made to the illustration in the method embodiments for the specific function implementation, which is not described here again. The method and the apparatus for transmitting data provided by the embodiments of the present invention are applicable to the field of communications systems, but are not merely limited thereto.

Persons of ordinary skill in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (Read-Only Memory, ROM), a random access memory (Random Access Memory, RAM), and the like.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention is subject to the protection scope of the claims.

What is claimed is:

1. A method for transmitting data, wherein at least two second resource groups is comprised in each first resource group of at least one first resource group, wherein each of the second resource groups is capable of bearing at least two reference signals, and the at least two reference signals are corresponding to different antenna ports; wherein the first resource group comprises a physical resource block pair, and the second resource group comprises a resource element (RE);

wherein the method comprises:
encoding data to be transmitted and generating two data streams from the encoded data;
mapping the two data streams onto available resource elements (REs) of two different antenna ports, wherein the reference signals corresponding to the two different antenna ports are borne on two different second resource groups of the first resource group; and
transmitting, on the available REs of the two different antenna ports, data on the two antenna ports.

2. An apparatus for transmitting data, wherein at least two second resource groups are comprised in each first resource group of at least one first resource group, wherein each of the second resource groups is capable of bearing at least two reference signals, and the at least two reference signals are corresponding to different antenna ports;

wherein the apparatus comprises:
a processor, configured to encode data to be transmitted and generate two data streams from the encoded data;

the processor, configured to map the two data streams generated onto available resource elements (REs) of two different antenna ports, wherein the reference signals corresponding to the two different antenna ports are borne on two different second resource groups of the first resource group, wherein the two different second resource groups are orthogonal to each other in time and frequency, and each of the two different second resource groups comprises 12 REs; and a transmitter, configured to transmit, on the available REs of the two different antenna ports, data mapped onto the two antenna ports.

3. A non-transitory computer-readable storage medium storing computer readable code comprising a program to implement the method according to claim 1.

4. The method according to claim 1, wherein the data is enhanced physical downlink control channel (E-PDCCH) data.

5. The method according to claim 1, wherein the reference signals are demodulation reference signals (DMRS).

6. The method according to claim 1, wherein the reference signals are user equipment (UE) specific reference signals.

7. The method according claim 1, wherein the at least two reference signals borne on the same one of the second resource groups occupy the same time frequency resource and are distinguished by different sequences.

8. The apparatus according to claim 2, wherein the available REs of the antenna ports comprise REs, in the first resource group, except an RE occupied by a physical downlink control channel (PDCCH) and a reference signal.

9. The apparatus according to claim 2, wherein the data is enhanced physical downlink control channel (E-PDCCH) data.

10. The apparatus according to claim 2, wherein the reference signals are demodulation reference signals (DMRS).

11. The apparatus according to claim 2, wherein the reference signals are user equipment (UE) specific reference signals.

12. The apparatus according to claim 2, wherein the at least two reference signals borne on the same one of the second resource groups occupy the same time frequency resource and are distinguished by different sequences.

13. A method for transmitting data, wherein at least two second resource groups is comprised in each first resource group of at least one first resource group, wherein each of the second resource groups is capable of bearing at least two reference signals, and the at least two reference signals are corresponding to different antenna ports;
  wherein the method comprises:
    encoding data to be transmitted and generating two data streams from the encoded data;
    mapping the two data streams onto available resource elements (REs) of two different antenna ports, wherein the reference signals corresponding to the two different antenna ports are borne on two different second resource groups of the first resource group; and
    transmitting, on the available REs of the two different antenna ports, data on the two antenna ports;
    wherein the available REs of the antenna ports comprise REs, in the first resource group, except an RE occupied by a physical downlink control channel (PDCCH) and a reference signal.

14. A method for transmitting data, wherein at least two second resource groups is comprised in each first resource group of at least one first resource group, wherein each of the second resource groups is capable of bearing at least two reference signals, and the at least two reference signals are corresponding to different antenna ports;
  wherein the method comprises:
    encoding data to be transmitted and generating two data streams from the encoded data;
    mapping the two data streams onto available resource elements (REs) of two different antenna ports, wherein the reference signals corresponding to the two different antenna ports are borne on two different second resource groups of the first resource group, wherein the two different second resource groups are orthogonal to each other in time and frequency, and each of the two different second resource groups comprises 12 REs; and
    transmitting, on the available REs of the two different antenna ports, data on the two antenna ports.

15. A method for transmitting data, wherein at least two second resource groups is comprised in each first resource group of at least one first resource group, wherein each of the second resource groups is capable of bearing at least two reference signals, and the at least two reference signals are corresponding to different antenna ports;
  wherein the method comprises:
    encoding data to be transmitted and generating two data streams from the encoded data;
    mapping the two data streams onto available resource elements (REs) of two different antenna ports, wherein the reference signals corresponding to the two different antenna ports are borne on two different second resource groups of the first resource group; and
    transmitting, on the available REs of the two different antenna ports, data on the two antenna ports;
  wherein a manner for the encoding is space frequency block coding or space time block coding.

16. A method for transmitting data, wherein at least two second resource groups is comprised in each first resource group of at least one first resource group, wherein each of the second resource groups is capable of bearing at least two reference signals, and the at least two reference signals are corresponding to different antenna ports;
  wherein the method comprises:
    encoding data to be transmitted and generating two data streams from the encoded data;
    mapping the two data streams onto available resource elements (REs) of two different antenna ports, wherein the reference signals corresponding to the two different antenna ports are borne on two different second resource groups of the first resource group; and
    transmitting, on the available REs of the two different antenna ports, data on the two antenna ports;
    wherein when at least two remote radio frequency units are connected to a base station, and one of the at least two remote radio frequency units is configured to provide a service for a user equipment, the method further comprises:
      allocating the different antenna ports corresponding to the at least two reference signals borne on the same one of the second resource groups to different remote radio frequency units of the at least two remote radio frequency units.

17. An apparatus for transmitting data, wherein at least two second resource groups is comprised in each first resource group of at least one first resource group, wherein each of the second resource groups is capable of bearing at least two reference signals, and the at least two reference signals are corresponding to different antenna ports;
  wherein the apparatus comprises:
    a processor, configured to encode data to be transmitted and generate two data streams from the encoded data;
    the processor, configured to map the two data streams generated onto available resource elements (REs) of two different antenna ports, wherein the reference signals corresponding to the two different antenna ports are borne on two different second resource groups of the first resource group; and
    a transmitter, configured to transmit, on the available REs of the two different antenna ports, data mapped onto the two antenna ports;
    wherein a manner for the encoding is space frequency block coding or space time block coding.

18. An apparatus for transmitting data, wherein at least two second resource groups is comprised in each first resource group of at least one first resource group, wherein each of the second resource groups is capable of bearing at least two reference signals, and the at least two reference signals are corresponding to different antenna ports;
  wherein the apparatus comprises:
    a processor configured to encode data to be transmitted and generate two data streams from the encoded data;
    the processor configured to map the two data streams generated onto available resource elements (REs) of two different antenna ports, wherein the reference signals corresponding to the two different antenna ports are borne on two different second resource groups of the first resource group;
    the processor further configured to allocate the different antenna ports corresponding to the at least two reference signals borne on the same one of the second resource groups to at least two different remote radio frequency units, wherein the at least two different remote radio frequency units are connected to a base station, and one of the at least two different remote radio frequency units is configured to provide a service for a user equipment; and
    a transmitter configured to transmit, on the available REs of the two different antenna ports, data mapped onto the two antenna ports.

19. An apparatus for transmitting data, wherein at least two second resource groups is comprised in each first resource group of at least one first resource group, wherein each of the second resource groups is capable of bearing at least two reference signals, and the at least two reference signals are corresponding to different antenna ports; wherein the first resource group comprises a physical resource block pair, and the second resource group comprises a resource element (RE);
  wherein the apparatus comprises:
    a processor configured to encode data to be transmitted and generate two data streams from the encoded data;
    the processor configured to map the two data streams generated onto available REs of two different antenna ports, wherein the reference signals corresponding to the two different antenna ports are borne on two different second resource groups of the first resource group; and
    a transmitter configured to transmit, on the available REs of the two different antenna ports, data mapped onto the two antenna ports.

* * * * *